US012657766B2

(12) United States Patent
Yang et al.

(10) Patent No.: US 12,657,766 B2
(45) Date of Patent: Jun. 16, 2026

(54) AERIAL VEHICLE, IMAGE PROCESSING METHOD AND DEVICE, MOVABLE PLATFORM

(71) Applicant: SZ DJI TECHNOLOGY CO., LTD., Shenzhen (CN)

(72) Inventors: Jian Yang, Shenzhen (CN); You Zhou, Shenzhen (CN); Zhenfei Yang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 1 day.

(21) Appl. No.: 18/766,948

(22) Filed: Jul. 9, 2024

(65) Prior Publication Data

US 2024/0362820 A1     Oct. 31, 2024

Related U.S. Application Data

(63) Continuation of application No. PCT/CN2022/071100, filed on Jan. 10, 2022.

(51) Int. Cl.
| | |
|---|---|
| *G06T 7/73* | (2017.01) |
| *B64U 10/14* | (2023.01) |
(Continued)

(52) U.S. Cl.
CPC .............. *G06T 7/74* (2017.01); *G06T 7/593* (2017.01); *H04N 13/239* (2018.05); *B64U 10/14* (2023.01);
(Continued)

(58) Field of Classification Search
None
See application file for complete search history.

(56) References Cited

U.S. PATENT DOCUMENTS

| | | | | |
|---|---|---|---|---|
| 9,630,714 B1* | 4/2017 | Gohl | ...................... | H04N 23/51 |
| 9,720,413 B1* | 8/2017 | Lema | .................... | G05D 1/102 |

(Continued)

FOREIGN PATENT DOCUMENTS

| | | |
|---|---|---|
| CN | 106931961 A | 7/2017 |
| CN | 210986289 U | 7/2020 |

(Continued)

OTHER PUBLICATIONS

International Search Report and Written Opinion mailed on Jun. 29, 2022, received for International Application No. PCT/CN2022/071100, filed on Jan. 10, 2022, 9 pages including English Translation.

*Primary Examiner* — Stefan Gadomski
(74) *Attorney, Agent, or Firm* — ANOVA LAW GROUP, PLLC

(57) ABSTRACT

An image processing method may be applied to a movable platform, and the movable platform may comprise a first vision sensor and a second vision sensor. The method may include obtaining a first localized image of the first vision sensor within an overlapping visual range, obtaining a second localized image of the second vision sensor within the overlapping visual range; acquiring an image captured by the first vision sensor at a first moment and an image captured at a second moment, the first vision sensor being positioned in space at the first moment differently than at the second moment; and determining a relative positional relationship between an object in the space where the movable platform is located and the movable platform based on the first localized image, the second localized image, the image captured at the first moment and the image captured at the second moment.

20 Claims, 7 Drawing Sheets

(51) Int. Cl.

| | |
|---|---|
| *B64U 101/30* | (2023.01) |
| *G05D 1/243* | (2024.01) |
| *G05D 101/15* | (2024.01) |
| *G05D 109/20* | (2024.01) |
| *G06T 7/593* | (2017.01) |
| *H04N 13/00* | (2018.01) |
| *H04N 13/239* | (2018.01) |

(52) U.S. Cl.
CPC ....... *B64U 2101/30* (2023.01); *G05D 1/2435* (2024.01); *G05D 2101/15* (2024.01); *G05D 2109/20* (2024.01); *G06T 2207/10012* (2013.01); *G06T 2207/10032* (2013.01); *G06T 2207/20081* (2013.01); *G06T 2207/20084* (2013.01); *G06T 2207/30252* (2013.01); *H04N 2013/0081* (2013.01)

(56) References Cited

U.S. PATENT DOCUMENTS

| | | | |
|---|---|---|---|
| 10,165,182 | B1 | 12/2018 | Chen |
| 10,266,263 | B2 * | 4/2019 | Zhang .................... G02B 13/06 |
| 11,104,437 | B1 * | 8/2021 | Durand ................. G01C 21/005 |
| 11,323,687 | B2 * | 5/2022 | Lacaze ............... G01B 11/2545 |
| 11,865,978 | B2 * | 1/2024 | Heafitz ................. H04N 13/296 |
| 12,007,768 | B2 * | 6/2024 | Lema ................... G05D 1/0088 |
| 2002/0180759 | A1 * | 12/2002 | Park ..................... H04N 9/8227 |
| | | | 348/E7.086 |
| 2005/0062869 | A1 * | 3/2005 | Zimmermann .......... H04N 7/18 |
| | | | 348/E7.071 |
| 2014/0132804 | A1 * | 5/2014 | Guissin ........... G08B 13/19645 |
| | | | 348/239 |
| 2014/0267596 | A1 * | 9/2014 | Geerds ................... H04N 23/51 |
| | | | 348/38 |
| 2016/0327950 | A1 * | 11/2016 | Bachrach ............. H04N 23/661 |
| 2016/0349599 | A1 * | 12/2016 | Macmillan ............. G03B 37/04 |
| 2016/0360104 | A1 * | 12/2016 | Zhang ................. H04N 23/698 |
| 2017/0351900 | A1 * | 12/2017 | Lee ...................... H04N 23/662 |
| 2018/0046187 | A1 * | 2/2018 | Martirosyan ........ G05D 1/0094 |
| 2020/0218252 | A1 * | 7/2020 | Lema .................... G06V 20/13 |
| 2023/0331485 | A1 * | 10/2023 | Zhang ............... G01C 21/3848 |

FOREIGN PATENT DOCUMENTS

| | | |
|---|---|---|
| CN | 112837207 A | 5/2021 |
| WO | 2021/104308 A1 | 6/2021 |

* cited by examiner monocular          Binocular          Binocular

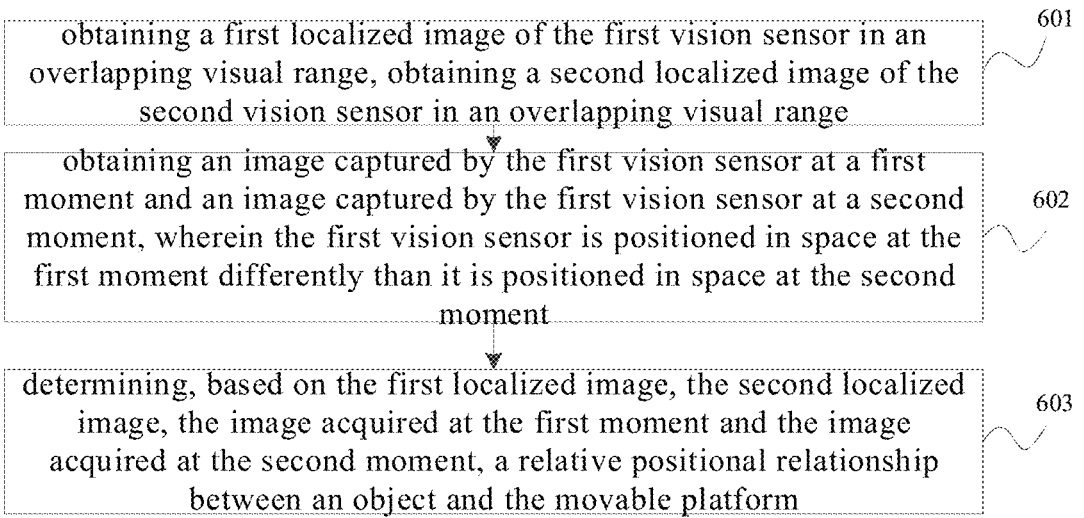

obtaining a first localized image of the first vision sensor in an overlapping visual range, obtaining a second localized image of the second vision sensor in an overlapping visual range          601 obtaining an image captured by the first vision sensor at a first moment and an image captured by the first vision sensor at a second moment, wherein the first vision sensor is positioned in space at the first moment differently than it is positioned in space at the second moment          602 determining, based on the first localized image, the second localized image, the image acquired at the first moment and the image acquired at the second moment, a relative positional relationship between an object and the movable platform          603

Fig. 6

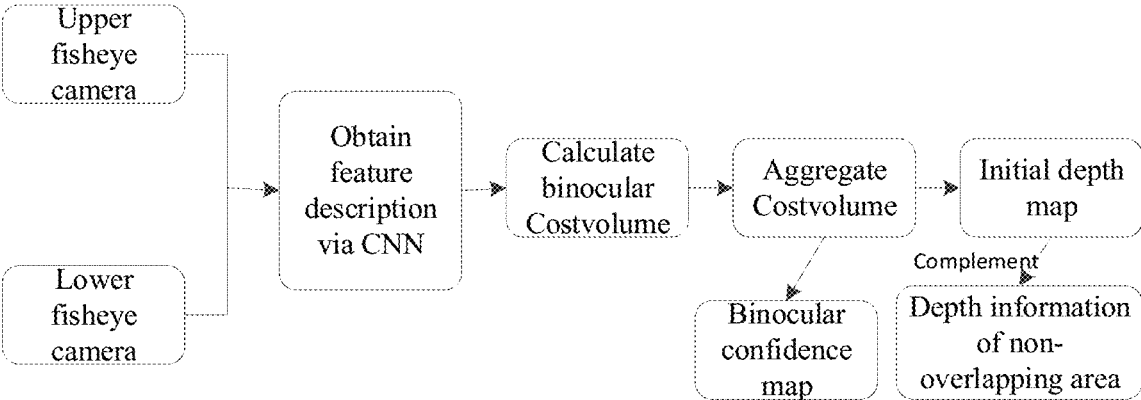

Upper fisheye camera

Lower fisheye camera

Obtain feature description via CNN

Calculate binocular Costvolume

Aggregate Costvolume

Initial depth map

Binocular confidence map

Complement

Depth information of non-overlapping area

Fig. 7

AERIAL VEHICLE, IMAGE PROCESSING METHOD AND DEVICE, MOVABLE PLATFORM

CROSS-REFERENCE TO RELATED APPLICATION

The present application is a continuation of International Application No. PCT/CN2022/071100, filed Jan. 10, 2022, the entire contents of which being incorporated herein by reference in its entirety.

TECHNICAL FIELD

The present disclosure relates to the field of computer vision technology, and specifically to an aerial vehicle, an image processing method and device, and a movable platform.

BACKGROUND

In order to ensure safety of a mobile platform during autonomous traveling, a vision sensor is often used to perceive objects around the mobile platform. The deployment method of the vision sensor on the movable platform and the processing method based on the image captured by the vision sensor will have a significant effect on the sensing results. Therefore, it is necessary to improve at least one of the deployment method of the vision sensor and the image processing method.

SUMMARY

In a first aspect, embodiments of the present disclosure provide an aerial vehicle, the aerial vehicle comprising a first vision sensor and a second vision sensor; a first visual range of the first vision sensor partially overlapping a second visual range of the second vision sensor, wherein the overlapping visual range comprises an environmental area around the aerial vehicle, the environmental area comprising areas where two back-to-back parts of the unmanned aerial vehicle face; the images captured by the first vision sensor and the second vision sensor are used to calculate positional information of objects in the ambient area, the positional information of objects being used to control the movement of the vehicle in space.

In a second aspect, embodiments of the present disclosure provide an image processing method, the method being applied to a movable platform, the movable platform comprising a first vision sensor and a second vision sensor, a first visual range of the first vision sensor partially overlapping with a second visual range of the second vision sensor, the method comprising: acquiring a first localized image of the first vision sensor in the overlapping visual range, acquiring a second localized image of the second vision sensor in the overlapping visual range; acquiring an image captured by the first vision sensor at a first moment and an image captured at a second moment, wherein the first vision sensor is positioned in space at the first moment differently from at the second moment; based on the first localized image, the second localized image, the image captured at the first moment and the image captured at the second moment, determining a relative positional relationship between an object in the space where the movable platform is located and the movable platform.

In a third aspect, embodiments of the present disclosure provide an image processing device comprising a processor, the device being applied to a movable platform, the movable platform comprising a first vision sensor and a second visual sensor, a first visual range of the first vision sensor partially overlapping a second visual range of the second visual sensor, the processor being used to perform the steps of: acquiring a first partial image of the first vision sensor in an overlapping visual range, acquiring a first partial image of the second vision sensor in the overlapping visual range; acquiring an image captured by the first vision sensor at a first moment and an image captured at a second moment, wherein the first vision sensor is positioned in space at the first moment differently than at the second moment; based on the first partial image, the second localized image, the image captured at the first moment and the image captured at the second moment, determining a relative positional relationship between an object in the space where the movable platform is located and the movable platform.

In a fourth aspect, embodiments of the present disclosure provide a movable platform comprising: a first vision sensor and a second vision sensor for capturing images of an environmental area around the movable platform, respectively, the first visual range of the first vision sensor partially overlapping with the second visual range of the second vision sensor; and an image processing device as described in any of the embodiments.

Applying the program of embodiments of the present disclosure, a first vision sensor and a second vision sensor with partially overlapping visual ranges are mounted on a vehicle, and since the overlapping visual ranges comprise an environmental area surrounding the vehicle and the environmental area comprises two areas where two opposite parts of the vehicle face, it is possible to obtain positional information of an object in two areas facing each other in the environmental area surrounding the vehicle; In addition, it is also possible to obtain positional information of objects in a non-overlapping visual range of the vehicle. Thus, with the embodiments of the present disclosure, a large sensing range can be obtained by deploying only two visual sensors on the vehicle, and the visual sensors are simple and low-cost in their configuration, thereby reducing the weight and cost of the vehicle, and improving the safety of the vehicle's movement in space.

In addition, the relative positional relationship between the object in space and the movable platform is determined based on the first partial image of the first vision sensor in the overlapping visual range, the second partial image of the second vision sensor in the overlapping visual range, and the image acquired by the first vision sensor at a first moment and the image acquired at a second moment together, so that, on the one hand, it is possible to improve the range of perception of the object in space; on the other hand, being able to improve the accuracy of the perception so as to accurately obtain the relative positional relationship of a larger range of objects in the space.

It should be understood that the above general description and the detailed description that follows are exemplary and explanatory only and do not limit the present application.

BRIEF DESCRIPTION OF THE DRAWINGS

In order to explain the technical features of embodiments of the present disclosure more clearly, the drawings used in the present disclosure are briefly introduced as follow. Obviously, the drawings in the following description are some exemplary embodiments of the present disclosure. Ordinary person skilled in the art may obtain other drawings and features based on these disclosed drawings without inventive efforts.

Figure 1:
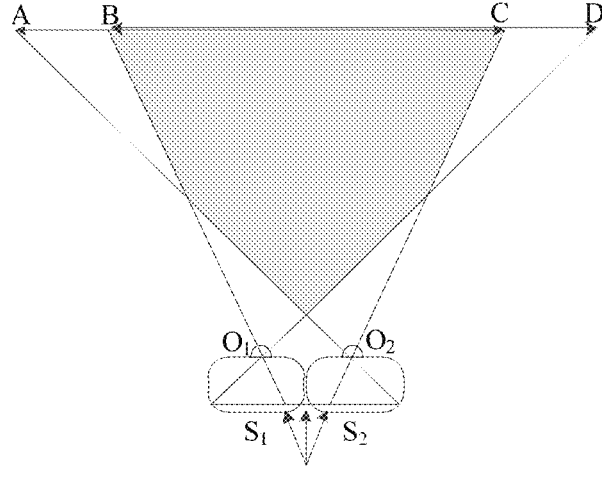

FIG. 1 is a schematic representation of a coverage of a binocular vision sensor in the related art.

Figure 2:
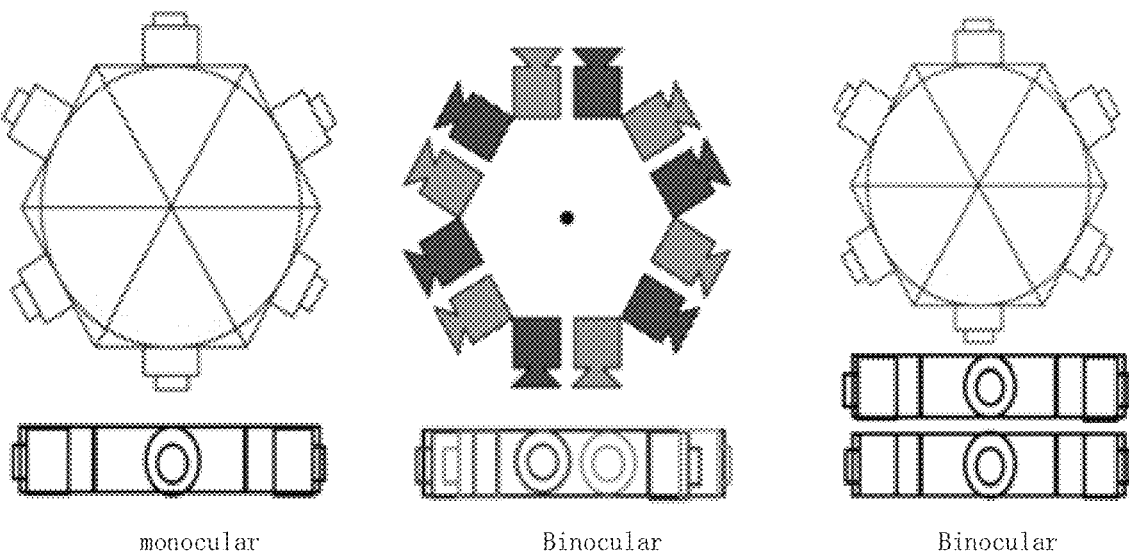

FIG. 2 is a schematic diagram of a layout of the vision sensor.

Figure 3:
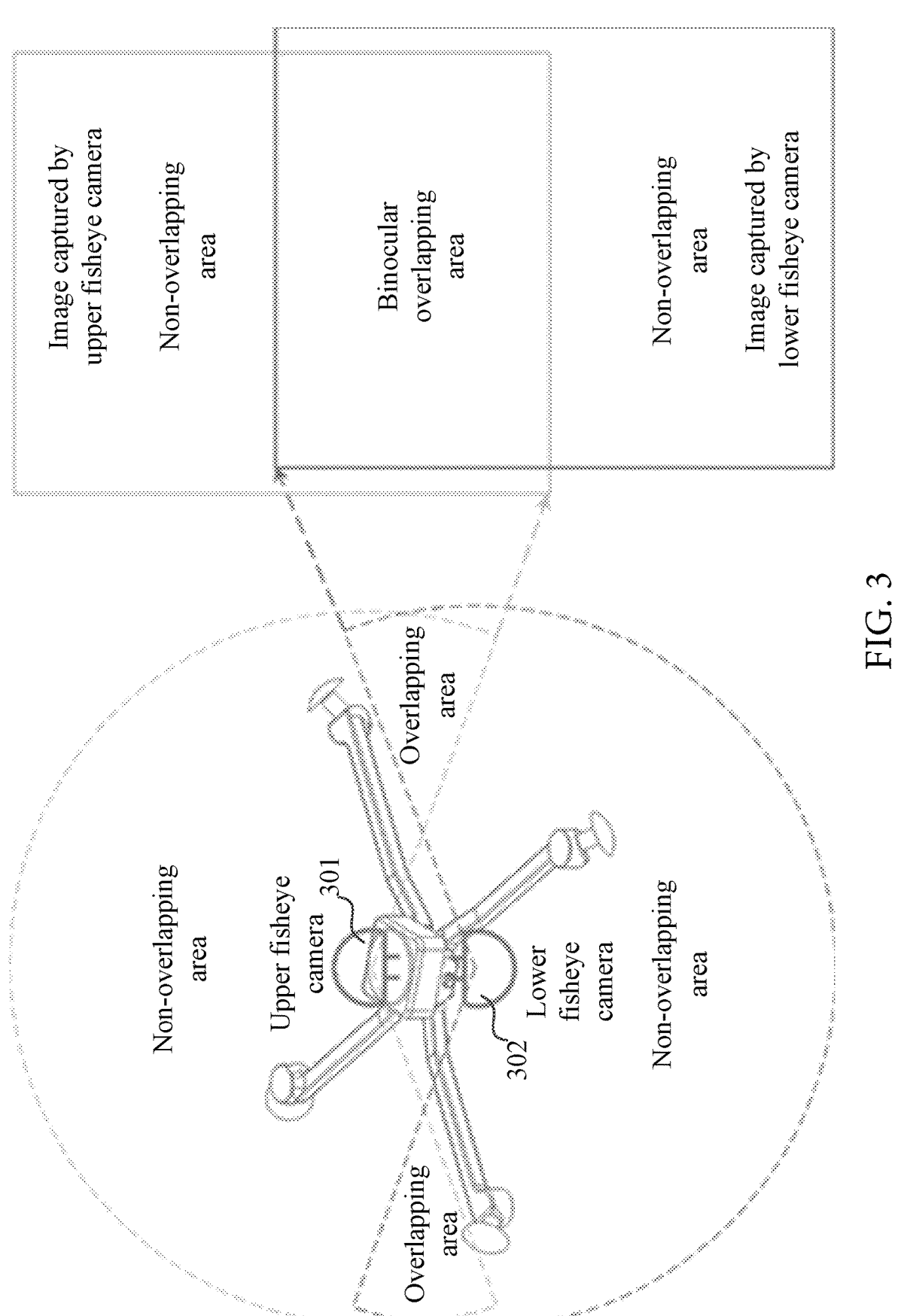

FIG. 3 is a schematic diagram of a vehicle of an embodiment of the present disclosure.

Figure 4A:
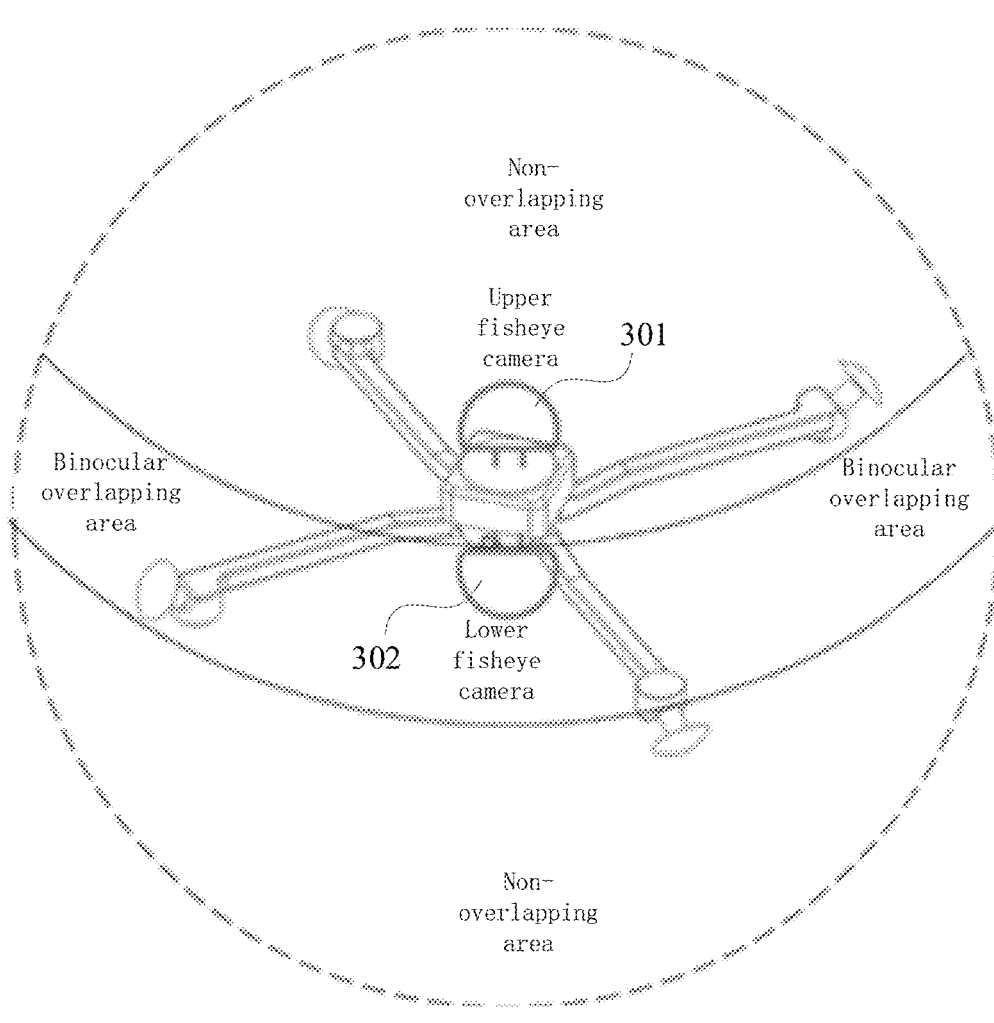
Figure 4B:
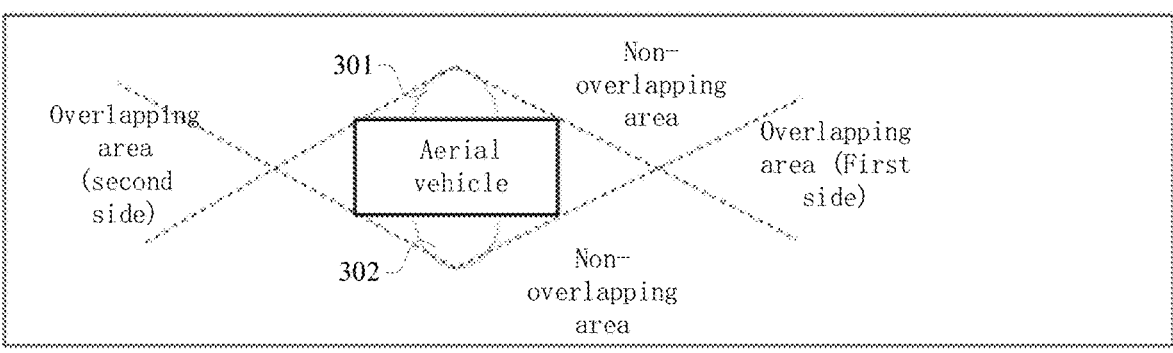

FIGS. 4A and 4B are schematic illustrations of the coverage of a vision sensor of an embodiment of the present disclosure, respectively.

Figure 5:
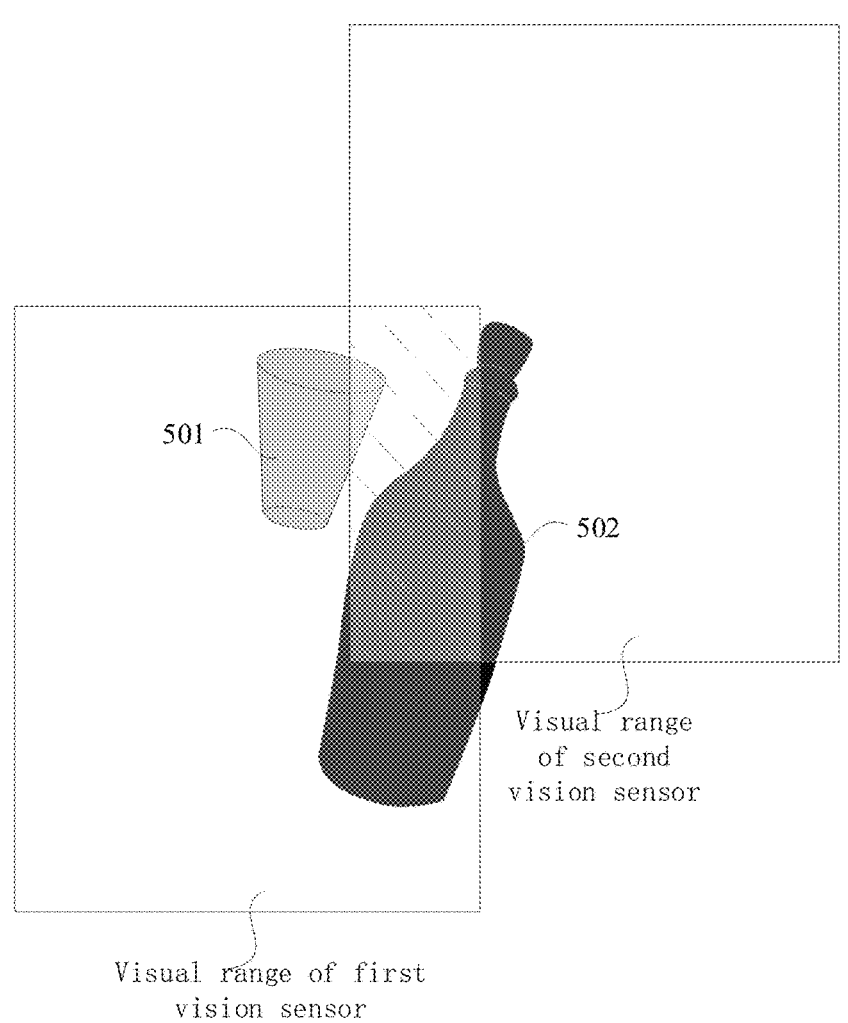

FIG. 5 is a schematic diagram of a semantic-based determination of relative positional relationships of an embodiment of the present disclosure.

FIG. 6 is a flowchart of an image processing method of an embodiment of the present disclosure.

FIG. 7 is a schematic diagram of a binocular depth estimation process of an embodiment of the present disclosure.

Figure 8:
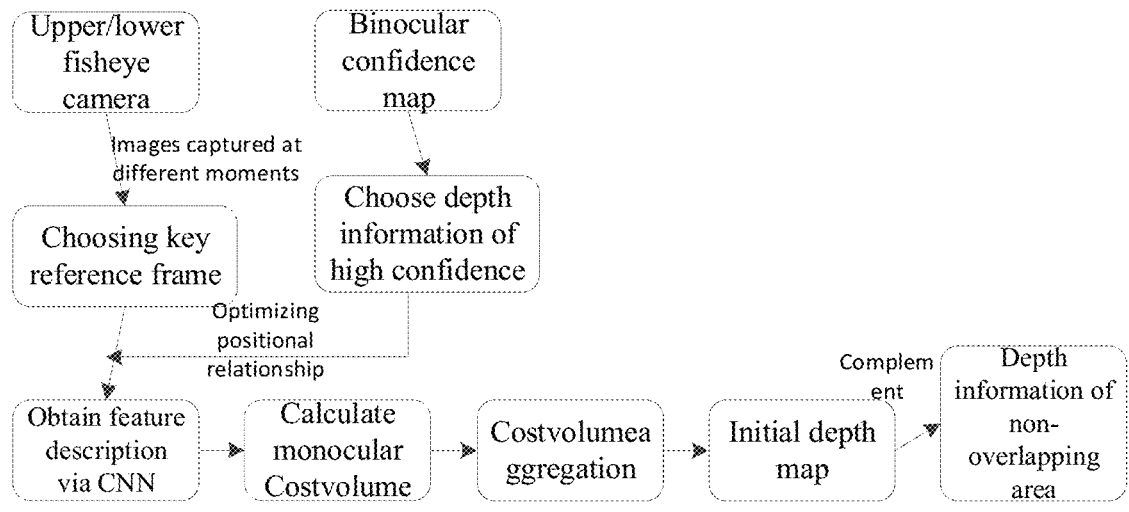

FIG. 8 is a schematic diagram of a monocular depth estimation process of an embodiment of the present disclosure.

Figure 9:
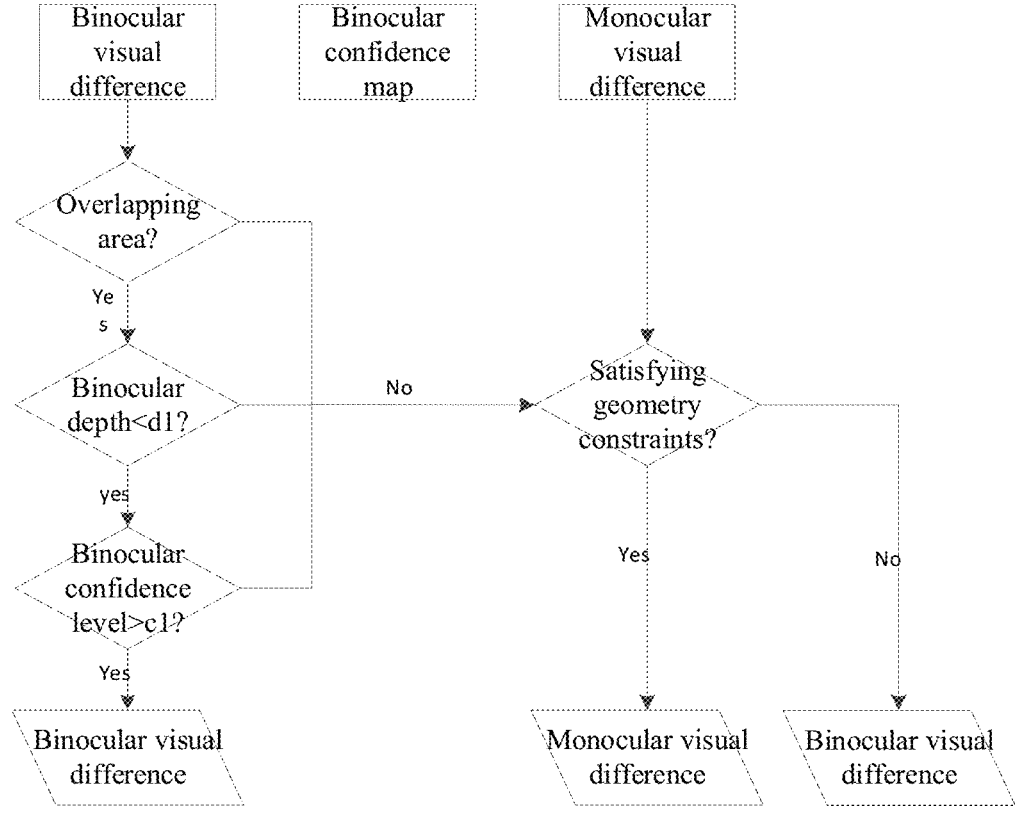

FIG. 9 is an overall flowchart of an embodiment of the present disclosure.

Figure 10:
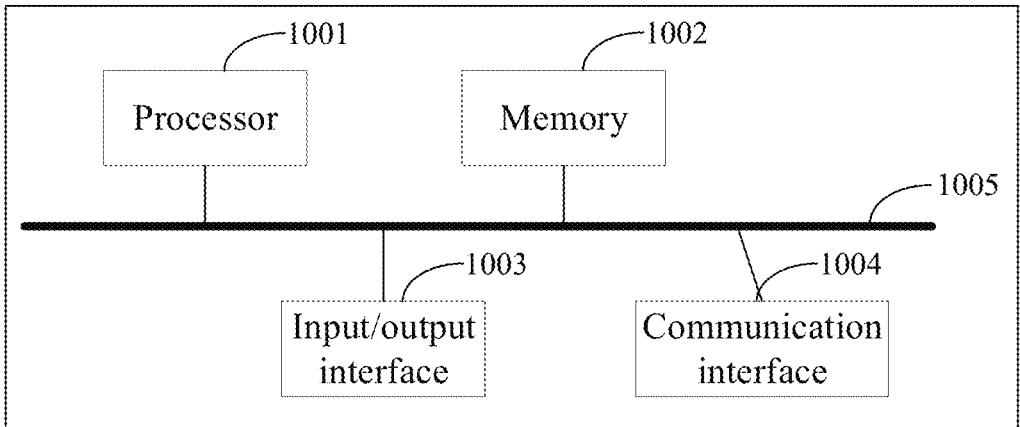

FIG. 10 is a schematic diagram of a hardware structure of an image processing device of an embodiment of the present disclosure.

Figure 11:
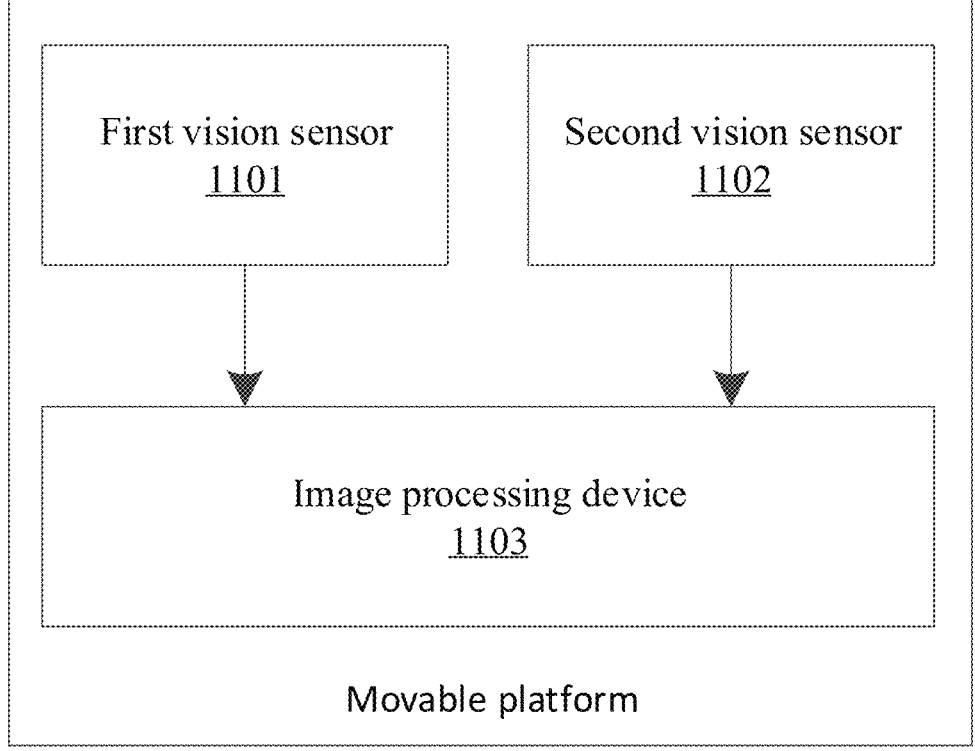

FIG. 11 is a schematic diagram of a removable platform of an embodiment of the present disclosure.

DETAILED DESCRIPTION

Exemplary embodiments will be described herein in detail, examples of which are represented in the accompanying drawings. When the following description relates to the accompanying drawings, the same numerals in the different accompanying drawings indicate the same or similar elements unless otherwise indicated. The embodiments described in the following exemplary embodiments do not represent all embodiments consistent with the present disclosure. Rather, they are only examples of devices and methods consistent with some aspects of the present disclosure as detailed in the appended claims.

The terms used in this disclosure are used solely for the purpose of describing particular embodiments and are not intended to limit the present disclosure. The singular forms of "a," "the," and "the" used in this specification and the appended claims are also intended to encompass the plurality, unless the context clearly indicates otherwise. It should also be understood that the term "and/or" as used herein refers to and encompasses any or all possible combinations of one or more of the associated listed items.

It should be understood that while the terms, first, second, third, etc. may be employed in the present disclosure to describe various types of information, such information should not be limited to these terms. These terms are only used to distinguish the same type of information from one another. For example, without departing from the scope of the present disclosure, first information may also be referred to as second information, and similarly, second information may be referred to as first information. Depending on the context, as used herein, the phrase "if" may be interpreted as "at . . . " or "when . . . " or "in response to a determination . . . ".

In the information age, computers are more and more widely used in various fields. As an important field of intelligent computing, computer vision has been greatly developed and applied. Computer vision relies on an imaging system instead of a visual organ as an input sensitive means, and the most commonly used is a visual sensor. When computer vision is applied to a movable platform, the objects around the movable platform are perceived with the help of visual sensors, and based on the perception results, the movement of the movable platform (including the movement speed, movement direction, etc.) is controlled. For example, a Stereo Vision System can be arranged on the movable platform. The Stereo Vision System adopts binocular algorithm to calculate depth, i.e., two visual sensors take two images at the same moment and different angles, and then through the difference between the two images and the positional relationship between the two visual sensors, the distance relationship between the scene and the visual sensors is calculated, so as to obtain the Depth Map. Alternatively, the depth can be calculated by a monocular algorithm, i.e., the vision sensor takes pictures of the same object from different angles, and the same is done to calculate the depth information of the overlapping areas of the images taken from multiple angles. In order to improve the safety of the movable platform, it is necessary to maximize the range of sensing the surroundings of the movable platform. In related technology, the sensing range is generally enlarged in the following manner:

Mode 1: Due to the large non-overlapping area of the imaging of the binocular system and the low confidence of the depth information in the non-overlapping area, in the case of using the binocular method to obtain depth information, the overlapping visual range of the binocular vision sensors will generally be increased as much as possible by improving the layout of the binocular vision sensors. However, since the binocular algorithm can only calculate the depth information within the overlapping visual range of the two visual sensors, even if the overlapping visual range is increased, the range of depth information that can be calculated is still limited. As shown in FIGS. 1, $S_1$ and $S_2$ are two visual sensors, respectively, and the visible range of $S_1$ is the range corresponding to $BO_1 D$, and the visible range of $S_2$ is the range corresponding to $AO_2 C$. The overlapping visible range of $S_1$ and $S_2$ are shown in the gray area. Therefore, in this scenario, the depth information can only be accurately calculated for the scene in the gray area, while the left and right sides are the unique viewpoints of $S_1/S_2$, and the depth information cannot be accurately calculated. Therefore, this improved approach still fails to obtain depth information with a sufficiently large and accurate range. In addition, the binocular system has a limited baseline length and cannot observe longer distances.

Mode 2: Deploying multiple sets of visual sensors in multiple directions and angles. Referring to FIG. 2, in order to realize omnidirectional coverage, monocular vision sensors or binocular vision sensors are deployed in multiple directions and angles, such as front, back, left, right, top, and bottom, respectively. However, this layout is structurally complex, costly, arithmetic demanding, and increases the weight of the movable platform.

Mode 3: Monocular computation is used to obtain depth information. However, this approach requires the vision sensor to move, and it is difficult to generate an effective depth map when the vision sensor is stationary or when the attitude change is too large or too small, so that the depth information of the object cannot be estimated. Moreover, the photographed object cannot move and must be a stationary object, and thus the robustness of the depth information obtained by the monocular approach is poor. In addition, when the positional relationship of the vision sensor is inaccurate at different moments, the accuracy of the acquired depth information will be seriously affected.

Based on this, embodiments of the present disclosure provide an aerial vehicle, see FIG. 3, the aerial vehicle comprising:

A first vision sensor 301 and a second vision sensor 302; a first visual range of the first vision sensor 301 partially overlapping a second visual range of the second vision sensor 302, wherein the overlapping visual range comprises an ambient area surrounding the vehicle, the ambient area comprising an area where two back-to-back or opposing portions of the vehicle face;

The images captured by the first vision sensor 301 and the second vision sensor 302 are used to calculate positional information of objects in the ambient area, the positional information of the objects being used to control the movement of the vehicle in space.

The aerial vehicle of an embodiment of the present disclosure may be an unmanned aerial vehicle, for example, a multi-rotor unmanned aerial vehicle. The vehicle may fly autonomously in space or in response to control commands given by a user via gestures, remote control, voice control, etc., in space.

A first vision sensor 301 and a second vision sensor 302 may be laid out on the vehicle. The visual range of the first vision sensor 301 is referred to as the first visual range and the visual range of the second vision sensor 302 is referred to as the second visual range. The overlapping visual range of the first visual range and the second visual range may include two regions of the vehicle that are oriented towards opposite parts of the vehicle, including, for example, a top-facing region and a bottom-facing region of the vehicle, or, alternatively, a left-side-facing region and a right-side-facing region of the vehicle, or a front-side-facing region and a rear-side-facing region of the vehicle. Wherein the overlapping visual range is also referred to as an overlapping region or binocular overlapping region, and the non-overlapping visual range is also referred to as a non-overlapping region or binocular non-overlapping region.

In some embodiments, one of the first vision sensor 301 and the second vision sensor 302 may be provided at the top of the vehicle and the other at the bottom of the vehicle such that the overlapping visual range comprises a left-side facing area and a right-side facing area of the vehicle, or comprises a front-side facing area and a rear-side facing area of the vehicle. In this case, the non-overlapping visual range of the first vision sensor 301 and the second vision sensor 302 comprises an environmental aera at the top of the vehicle and an environmental aera at the bottom of vehicle.

In some embodiments, one of the first vision sensor 301 and the second vision sensor 302 may be provided on the left side of the vehicle and the other on the right side of the vehicle such that the overlapping visual range comprises an environmental area at the top and an environmental area at the bottom of the vehicle. In this case, the non-overlapping visual range of the first vision sensor 301 and the second vision sensor 302 comprises an environmental aera on the left side and an environmental aera on the right side of the vehicle.

In other embodiments, one of the first vision sensor 301 and the second vision sensor 302 may be provided on the front side of the vehicle and the other on the rear side of the vehicle such that the overlapping visual range includes an environmental area at the top of the vehicle and an environmental area at the bottom. In this case, the non-overlapping visual range of the first vision sensor 301 and the second vision sensor 302 comprises an environmental aera on the front side and an environmental aera on the rear side of the vehicle.

In addition to the above-described setting method, the positions of the first vision sensor 301 and the second vision sensor 302 may be set to other positions according to practical needs, as long as it is possible to make the overlapping visual range of the two vision sensors include the areas where the two back-to-back or opposing parts of the aerial vehicle face. For case of understanding, the solution of the present disclosure is illustrated below by taking an example of one of the first vision sensor 301 and the second vision sensor 302 being provided at the top of the aerial vehicle and the other being provided at the bottom of the aerial vehicle. In the images captured by both the first vision sensor 301 and the second vision sensor 302, a localized image corresponding to a binocular overlapping region and a localized image corresponding to a region with no overlapping is included.

In one embodiment, the aerial vehicle may include an arm and a fuselage. Wherein the first vision sensor 301 and the second vision sensor 302 are both mounted on the fuselage. In the case shown in FIG. 4A, the top is a region above the arm and the fuselage of the vehicle, the bottom is a region below the arm and the fuselage of the vehicle, and the side is a region next to the arm and the fuselage. When the vehicle is aerial horizontally in space, the top is a side facing the sky, the bottom is a side facing the ground, and the side portion is one or more sides other than the top and bottom. In this way, the total visual range of the first vision sensor 301 and the second vision sensor 302 covers almost all directions and angles of the space in which the vehicle is located, with a large coverage area.

In some embodiments, at least one of the first vision sensor 301 and the second vision sensor 302 may be a fisheye camera. Since the observation range of a single fisheye camera is relatively large (greater than 180 degrees), omnidirectional observation can be realized by setting up two fisheye cameras, which is simple in configuration, low in cost, and light in weight, and can be better suited for application scenarios such as aircrafts that have stricter requirements for the weight of the on-board peripherals. In the case where two fisheye cameras are deployed separately on the fuselage of the aircraft, the first vision sensor 301 may also be referred to as an upper fisheye camera and the second vision sensor 302 may also be referred to as a lower fisheye camera. The structures of the first vision sensor 301 and the second vision sensor 302 may be the same or different, and the present disclosure is not limited thereto. In some embodiments, the first vision sensor or the second vision sensor comprises a light-sensitive circuit module and a set of fisheye optical modules mounted in conjunction with the light-sensitive circuit.

In most cases, the vehicle is aerial horizontally in space, or the aerial speed of the vehicle includes a component in the horizontal direction, and thus a high precision is required for sensing the environmental aera of the side portion of the vehicle. The overlapping visual range of the first vision sensor 301 and the second vision sensor 302 includes the environmental aera of the side portion of the vehicle, and thus an object in the environmental aera of the side portion can be sensed by both vision sensors at the same time, which enables to improve the sensing accuracy of the object in the environmental aera of the side portion.

In addition, in the related art, the overlapping visual range of a binocular vision system on a vehicle generally includes only one side of the vehicle, whereas the overlapping visual range in the embodiments of the present disclosure includes two areas opposing or back-to-back facing each other, as shown in FIG. 4B, wherein the two areas facing each other back-to-back include a first side and a second side of the vehicle, wherein the first and second sides can be a left side and a right side of the vehicle, respectively, or a front side and a rear side of the vehicle, or a front side and a rear side of the vehicle. Compared to related technologies, the overlapping visual range of the first vision sensor 301 and the second vision sensor 302 of the embodiments of the present disclosure is larger.

Images captured by the first vision sensor 301 and the second vision sensor 302 are used to calculate positional information of an object in an environmental area. The positional information may be determined based on a relative positional relationship between the object and the vehicle, wherein the relative positional relationship may be characterized by depth information of the object, parallax information, or positional information itself. In the case where the relative positional relationship is characterized through position information of the object, the relative positional relationship may be directly determined as position information of the object. In the case where the relative positional relationship is characterized through depth information or parallax information of the object, the depth information or parallax information may be converted into position information. For case of description, the following is an example of a solution of the present disclosure in which the relative positional relationship is depth information. It will be understood by those skilled in the art that other relative positional relationships may also be used instead of the depth information in the following.

In some embodiments, the relative positional relationship of the object in space to the vehicle is determined based on a combination of: a first localized image of the first vision sensor 301 within the overlapping visual range, and a second localized image of the second vision sensor 302 within the overlapping visual range; and, an image captured by a vision sensor whose visual range covering the object at a first moment and an image captured by the vision sensor whose visual range covering the object at a second moment, wherein the vision sensor whose visual range covering the object has an attitude in space at the first moment, which is different from its attitude in space at the second moment.

The points on the first localized image and the second localized image are in one-to-one correspondence, and the corresponding points on the two localized images are points of the same object in space. The first localized image and the second localized image may be images obtained by acquisition at the same moment. The two localized images acquired at the same moment may be acquired based on the timestamps of the first localized image and the second localized image, or the first vision sensor and the second vision sensor may be controlled to acquire images by the same clock signal, so as to obtain the two localized images acquired at the same moment. It should be noted that the same moment here does not mean strictly synchronized in time, and as long as the two images are acquired within a certain range of time difference (e.g., a few milliseconds), the two images can be considered to be acquired at the same moment due to the short time difference and little change in the scene.

Further, the first localized image and the second localized image may both be images captured at the first moment in time, so as to improve the accuracy of the relative positional relationship of the final output. In the case where the object is an object in an environmental area at the top of the vehicle, the vision sensor whose visual range covers the object is the first vision sensor 301. In the case where the object is an object in an environmental area at the bottom of the vehicle, the vision sensor whose visual range covers the object is the second vision sensor 302. The first moment is different from the second moment. The position in space of the vision sensor whose visual range covers the object at the first moment is different from the position in space of the vision sensor whose visual range covers the object at the second moment, either by a change in the position of the vehicle itself, which results in a change in the position of the visual sensor, or by keeping constant position of the vehicle itself while only changing the position of the visual sensor.

In some embodiments, the relative position of a first object in an environmental aera at the top or bottom of the vehicle in relation to the vehicle may be obtained based on the relative position of an object in the overlapping visual range having the same semantic information as the first object in relation to the vehicle. For ease of description, the scheme of embodiments of the present disclosure is illustrated below using the first object as an example of an object in an environmental aera on top of the aerial vehicle, and using a vision sensor whose visual range covers the first object as an example of the first vision sensor 301. Those skilled in the art can understand that the processing in the case where the first object is an object in an environmental aera at the bottom of the aerial vehicle and the vision sensor whose visual range covers the first object is the second vision sensor 302 is similar and will not be repeated herein. The embodiments of the present disclosure predict the depth information of an object within the non-overlapping range of the binoculars based on the semantic information of the object, so as to not only acquire the depth information within the overlapping range of the binoculars, but also acquire the depth information beyond the overlapping range of the binoculars, fully utilizing the images captured by the two visual sensors, and expanding the scope of acquisition of the depth information.

Referring to FIG. 5, assuming that a portion of the area on the cup 501 and a portion of the area on the bottle 502 are included in the overlapping visual range (shown in the portion of the figure with slash lines), a portion of the area on the cup 501 that is within the visual range of the first vision sensor 301 and outside the visual range of the second vision sensor 302 may be determined based on the depth information of the cup 501 in the overlapping visual range. In some embodiments, depth information for individual points on the cup 501 that are within the visual range of the first vision sensor 302 and outside the visual range of the second vision sensor 302 may be obtained based on the depth information for one or more points on the cup 501 within the overlapping visual range. Among other things, the semantic information of the individual points in the image may be obtained by performing semantic recognition of the image. For example, the image may be input into a pre-trained convolutional neural network, through which the semantic information of the individual points on the image is output.

In some embodiments, a relative positional relationship between an object having the same semantic information as the first object (referred to as a target object) within the overlapping visual range and the vehicle may be obtained based on a first localized image of the first vision sensor within the overlapping visual range and a second localized image of the second vision sensor within the overlapping visual range. Specifically, a binocular algorithm may be used to obtain depth information of the target object relative to the vehicle.

Further, a relative positional relationship between the first object and the vehicle can be jointly obtained based on the following information: a relative positional relationship $r_1$ obtained based on a prediction of a relative positional relationship between a target object and the vehicle, the target object being an object with the same semantic information as the first object within the overlapping visual range, the relative positional relationship between the target object and the vehicle being determined based on a first localized image of the first vision sensor in the overlapping visual range and a second localized image of the second vision sensor in the overlapping visual range, and, a relative positional relationship $r_2$ determined based on an image acquired by a vision sensor whose visual range covers the first object at a first moment and an image acquired by the vision sensor whose visual range covers the first object at a second moment, wherein the position in space at the first moment is different from the position in space at the second moment. Embodiments of the present disclosure use both the relative positional relationship $r_1$ between the first object and the vehicle, which is inferred based on semantic information, and the relative positional relationship $r_2$ between the first object and the vehicle, which is determined based on a monocular algorithm, which is able to improve the accuracy and robustness of the acquired depth information.

The process of obtaining the relative position relation $r_1$ may be referred to in the foregoing embodiments and will not be repeated herein. Taking the example that the first object is an object within the visual range of the first vision sensor 301, in acquiring the relative position relation $r_2$, depth information of the first object may be determined based on a positional relationship between a position of the first vision sensor at a first moment and a position of the first vision sensor at a second moment, as well as an image captured by the first vision sensor at the first moment and an image captured at the second moment. Wherein the first moment may be a current moment, the second moment may be a moment prior to the first moment (i.e., a historical moment), and the first localized image and the second localized image may be images captured at the first moment. In the above manner, depth information of the first object relative to the vehicle at the first moment can be determined.

An inertial measurement unit (IMU) can be used to determine the position of the first vision sensor at a first moment and the position of the first vision sensor at a second moment, thereby determining the positional relationship between the positions of the two moments. The IMU can be mounted directly on the first vision sensor, thereby allowing the output of the IMU to be directly determined as the position of the first vision sensor. Alternatively, the IMU may be mounted on a fuselage of the vehicle, whereby the posture of the first vision sensor may be determined from the output results of the IMU and the positional relationship between the vehicle and the first visual sensor.

In addition to calculating depth information for objects within the non-overlapping range of the binoculars, some embodiments of the present disclosure may also calculate depth information for objects within the overlapping range of the binoculars. In some embodiments, wherein the first vision sensor 301 and the second vision sensor 302 are disposed at the top and the bottom of the vehicle, respectively, then the ambient area comprises a left-side facing area and a right-side facing area of the vehicle, and/or comprises a front-side facing area and a rear-side facing area of the vehicle. For ease of description, the front-side, rear-side, left-side, and right-side facing areas are collectively referred to as the environmental aera of the side portion of the vehicle. In this case, the process of calculating the relative positional relationship of a first object in the environmental aera at the top or bottom of the vehicle to the vehicle is different from the process of calculating the relative positional relationship of a second object in the environmental aera at the side portion of the vehicle to the vehicle.

Specifically, the relative positional relationship between the second object and the vehicle may be obtained jointly based on the following information: a relative positional relationship $r_3$ obtained based on a first localized image of the first vision sensor in the overlapping visual range and a second localized image of the second vision sensor in the overlapping visual range, and a relative positional relationship $r_4$ determined based on an image acquired at a first moment and an image acquired at a second moment by the vision sensor whose visual range covers the second object, wherein the position in space of the vision sensor with a visual range covering the first object at the first moment is different than the position in space at the second moment. The relative positional relationship $r_3$ between the second object and the vehicle can be obtained using a binocular algorithm, and the way of obtaining the relative positional relationship $r_4$ between the second object and the vehicle can be referred to the way of obtaining the relative positional relationship $r_2$, which will not be repeated herein. By means of the present embodiment, it is possible to obtain a relative positional relationship between the second object and the aerial vehicle with high accuracy.

Embodiments of the present disclosure have the following advantages:

(1) Only two vision sensors can be used to cover the top, bottom, and side environmental areas of the vehicle, with simple sensor configurations, low cost, light weight, and large sensing range.

(2) A fusion of binocular algorithm, monocular algorithm, and semantic prediction-based approach to obtain the relative positional relationship between the object and the vehicle improves the robustness and accuracy of the output results.

Referring to FIG. 6, some embodiments of the present disclosure further provide an image processing method, the method being applied to a removable platform, the removable platform comprising a first vision sensor and a second vision sensor, the first vision sensor having a first visual range partially overlapping with a second visual range of the second vision sensor, the method comprising:

Step 601: obtaining a first localized image of the first vision sensor in an overlapping visual range, obtaining a second localized image of the second vision sensor in an overlapping visual range;

Step 602: obtaining an image captured by the first vision sensor at a first moment and an image captured by the first vision sensor at a second moment, wherein the first vision sensor is positioned in space at the first moment differently than it is positioned in space at the second moment;

Step 603: determining, based on the first localized image, the second localized image, the image acquired at the first moment and the image acquired at the second moment, a relative positional relationship between an object in the space where the movable platform is located and the movable platform.

The method of embodiments of the present disclosure may be used to calculate a relative positional relationship between an object in an environmental aera surrounding a movable platform such as an unmanned aerial vehicle, an unmanned vehicle, a movable robot, and the like, and the movable platform, and thereby calculating positional information of the object.

In the case where the movable platform is an unmanned aerial vehicle, one of the first vision sensor and the second vision sensor may be provided at the top of the fuselage of the unmanned aerial vehicle and the other at the bottom of the fuselage of the unmanned aerial vehicle. Alternatively, one of the first vision sensor and the second vision sensor is provided on a first side of the UAV and the other is provided on a second side of the UAV, the first side being opposite the second side. For example, the first side may be a left side of the UAV and the second side may be a right side of the UAV; or, the first side may be a front side of the UAV and the second side may be a rear side of the UAV. The unmanned aerial vehicle may be a vehicle in any of the preceding embodiments. In the case where the movable platform is an unmanned vehicle, the first vision sensor and the second vision sensor may be provided on two headlights of the unmanned vehicle, or on both sides of the windshield, respectively. In case the movable platform is a movable robot, the first vision sensor and the second vision sensor may be set at positions where the two eyes of the movable robot are located, respectively. The above-described setting of the first vision sensor and second vision sensor makes it possible for the overlapping visual range of the two vision sensors to cover as much as possible the area in the moving direction of the movable platform, thereby improving the precision of sensing objects in the moving direction of the movable platform. In addition to the application scenarios listed above, the movable platform may be other types of devices capable of autonomous movement, and the installation positions of the first vision sensor and second vision sensor may be set based on the type of the movable platform and/or other factors, which will not be further explained herein.

Both of the first vision sensor and the second vision sensor may be used individually as monocular vision sensors, thereby calculating depth information of the object based on the monocular algorithm. In addition, the first vision sensor and the second vision sensor may form a pair of non-rigid binoculars, thereby calculating the depth information of the object based on the binocular algorithm. Wherein the first vision sensor may be any one of the visual sensors on the movable platform. Taking the example that the movable platform is an unmanned aerial vehicle (UAV), the first vision sensor may be a vision sensor provided at the top of the body of the UAV or a vision sensor provided at the bottom of the body of the UAV.

The present disclosure does not limit the resolution of the first vision sensor and the second vision sensor. Optionally, the first vision sensor and the second vision sensor may use a vision sensor with a resolution of about 1280×960. If the resolution of the vision sensor is too low, the clarity of the captured image is too low, making it difficult to accurately recognize the features of the object in the image, thereby affecting the accuracy of the processing results. If the resolution of the vision sensor is too high, it will be very sensitive to interference between two vision sensors due to non-rigid connection. Therefore, by using a vision sensor with this resolution, image clarity and interference resistance can be effectively balanced.

In some embodiments, at least one of the first vision sensor and the second vision sensor may be a fisheye camera. Since a single fisheye camera has a relatively large observation range (greater than 180 degrees), omnidirectional observation can be realized by setting up 2 fisheye cameras, which has the advantages of simple configuration, low cost, and light weight.

In some embodiments, the area of the overlapping visual range of the first vision sensor and the second vision sensor is smaller than the area of the non-overlapping visual range. The related art generally expands the range of depth information that can be acquired by increasing the area of the overlapping visual ranges of the binocular vision sensors, and thus the area of the overlapping binocular regions is generally larger than the area of the non-overlapping regions (as shown in FIG. 1). Different from this, the area of the overlapping visual range of the two visual sensors of the present disclosure embodiments may be smaller than the area of the non-overlapping visual range, and by adopting a different processing method from that in the related art, the depth information in a larger range can also be accurately obtained. The processing method of the embodiment of the present disclosure is described in detail below.

In step 601, the first localized image and the second localized image may be images acquired at the same moment. During movement of the movable platform, the first localized image may be acquired in real time by a first vision sensor on the movable platform, the second localized image may be acquired by a second vision sensor on the movable platform, and based on the real-time acquisition of the first localized image and the second localized image, the relative positional relationship between the object in the environmental area surrounding the movable platform and the movable platform may be determined in real time. Of course, it is also possible to determine the relative position of the object in the environmental area surrounding the movable platform in relation to the movable platform at a historical moment by acquiring the first local image and the second local image acquired at a historical moment. Since the first localized image and the second localized image are both overlapping visual range images, the pixel points in the first localized image and the second localized image are one-to-one, and the corresponding points in both localized images correspond to the same object point in physical space.

In step 602, a portion of the first vision sensor in space at the first moment is different from a position in space at the second moment, either by a change in the position of the movable platform itself, which results in a change in the position of the first visual sensor, or by a constant position of the movable platform itself, but only changes the position of the first visual sensor. The first moment and the second moment are different moments, for example, the first moment may be a current moment and the second moment may be a historical moment prior to the current moment. Also for example, the first moment and the second moment are different historical moments prior to the current moment, respectively. Further, the first localized image and the second localized image may both be images captured at the first moment.

The IMU may be employed to determine a position of the first vision sensor at a first moment and a position at a second moment, thereby determining a positional relationship between the positions of the two moments. In the case where the movable platform is a vehicle, the position of the first vision sensor may also be determined based on wheel speed information, positioning information, etc. The IMU may be mounted directly to the first visual sensor, such that an output of the IMU may be directly determined as the position of the first visual sensor. Alternatively, the IMU may be mounted on a fuselage of a vehicle, such that the position of the first vision sensor may be determined from the output results of the IMU and a positional relationship between the vehicle and the first visual sensor. For example, in the case where the movable platform is an excavator and the first vision sensor is mounted on a mechanical arm of the excavator, the position of the excavator may be obtained by the IMU mounted on the body of the excavator, and based on the motor rotation angle and telescopic amount of the robotic arm, the positional relationship between the robotic arm and the excavator's body is determined, and then the position of the first visual sensor is determined.

In step 603, a first relative positional relationship between the object and the movable platform may be determined based on the first localized image and the second localized image; a second relative positional relationship between the object and the movable platform may be determined based on the image captured at the first moment and the image captured at the second moment; and a relative positional relationship between the object and the movable platform may be determined based on the first relative positional relationship and the second relative positional relationship; Wherein the process of determining the first relative positional relationship based on the first local image and the second local image may be realized based on a binocular algorithm, and the process of determining the second relative positional relationship based on the image acquired at a first moment and the image acquired at a second moment may be realized based on a monocular algorithm. The relative positional relationship between the object and the movable platform may be determined by fusing the first relative positional relationship and the second relative positional relationship obtained in different ways, thereby expanding the sensing range and improving the accuracy and robustness of the output relative position relationship.

In some embodiments, the process of calculating the relative positional relationship between an object in an overlapping visual range and the vehicle is different from the process of calculating the relative positional relationship between an object in a non-overlapping visual range and the vehicle.

For a first object that is within the visual range of the first vision sensor and outside the visual range of the second vision sensor, a relative positional relationship between a target object with the same semantic information as the first object within the overlapping visual ranges and the movable platform may be determined based on the first localized image and the second localized image. Based on the relative positional relationship between the target object and the movable platform, a first relative positional relationship between the first object and the movable platform is determined. For example, assuming that the overlapping visual range includes a portion of an area on the cup, depth information of other areas on the cup that are within the visual range of the first vision sensor and outside the visual range of the second vision sensor may be determined based on depth information of the portion of the cup within the overlapping visual range. In some embodiments, an image captured by the first vision sensor may be input into a pre-trained convolutional neural network, through which semantic information of individual points on the image is output. The process of determining the relative position of the target object in relation to the movable platform may be realized based on a binocular algorithm.

In some embodiments, in the case where the second relative positional relationship satisfies geometric constraints corresponding to the first object, the second relative positional relationship may be determined as a relative positional relationship between the first object and the movable platform; in the case where the second relative positional relationship does not satisfy the geometric constraints, the first relative positional relationship may be determined as a relative positional relationship between the first object and the movable platform.

The geometric constraints may be geometric positional relationships between points on the first object. For example, in general, the depth information of neighboring points on the same object is generally smoothly varying, i.e., the difference in depth information of neighboring points on the same object is generally less than a predetermined depth difference threshold. The depth information of the points on the first object may be calculated in the manner in the above embodiment, and if the difference of the depth information of the neighboring points is greater than the depth difference threshold, the geometric constraints corresponding to the first object are considered not to be satisfied, and the geometric constraints corresponding to the first object are considered to be satisfied only if the difference of the depth information of the neighboring points is less than or equal to the depth difference threshold. With the monocular algorithm, the robustness of the depth information obtained for the moving object is poor. And the relative positional relationship determined based on semantics does not have the constraints of a physical model and has poor robustness. The embodiments of the present disclosure utilize the two algorithms to complement each other in the manner described above, and in the case that one algorithm does not satisfy the constraints, the relative positional relationship obtained by the other algorithm is used, so as to be able to improve the robustness of the ultimately determined relative position relationship.

For a second object that is within the overlapping visual range, a first relative positional relationship between the second object and the movable platform may be determined directly based on the first localized image and the second localized image. Since the second object is in the overlapping visual range, the depth information of the second object can be obtained directly based on the two local images using a binocular algorithm with high accuracy and robustness. At the same time, a second relative positional relationship between the second object and the movable platform may also be obtained based on the image acquired at a first moment and the image acquired at a second moment.

In some embodiments, the first relative positional relationship may be determined as a relative positional relationship between the second object and the movable platform in the event that a predetermined condition is satisfied; the second relative positional relationship may be determined as a relative positional relationship between the second object and the movable platform in the event that a predetermined condition is not satisfied; the predetermined condition comprising: a depth of the second object being less than a predetermined depth threshold; and a confidence level of the first relative positional relationship is greater than a predetermined confidence level threshold.

The binocular algorithm has a higher accuracy, but due to the limited length of the baseline of the binocular system, it is not possible to observe a longer distance, therefore, in the case where the depth of the second object is greater than or equal to a predetermined depth threshold, it is considered that the confidence of the first relative positional relationship is lower, so that the second relative positional relationship can be determined as a relative positional relationship between the second object and the movable platform. At the same time, in the case of occlusion and the like, the confidence level of the first relative positional relationship obtained by the binocular algorithm may not be high, and thus, in the case where the confidence level of the first relative positional relationship is low, it may also be possible to determine the second relative positional relationship as a relative positional relationship between the second object and the movable platform. In this way, the accuracy and reliability of the output results can be improved.

In some embodiments, the first relative positional relationship is obtained by processing the first localized image and the second localized image by a first neural network, and the second relative positional relationship is obtained by processing the image acquired at the first moment and the image acquired at the second moment by a second neural network. This embodiment processes the images directly through the neural networks to output the first relative positional relationship and the second relative position relationship, which is a simple process with low complexity and improves the sensory field of visual perception due to the ability of the neural network to understand and speculate about the environment. The first neural network and/or the second neural network may be a convolutional neural network or may be other types of neural networks. The type of the first neural network and the second neural network may be the same or different.

In some embodiments, the first neural network is trained based on a first localized sample image of the first vision sensor in the overlapping visual range and a second localized sample image of the second vision sensor in the overlapping visual range; the second neural network is trained based on a sample image acquired by the first vision sensor at a third moment and a sample image acquired at a fourth moment; wherein the first vision sensor is positioned in space at the third moment differently than it is positioned in space at the fourth moment.

The specific processing of the two neural networks is described below. Referring to FIG. 7, the processing of the first neural network comprises:

(1) Performing feature extraction on the first localized image and the second localized image, respectively, to obtain a feature description F1 of the first localized image and a feature description F2 of the second localized image. In order to ensure the consistency of the features, the network parameters can be shared when calculating the two feature descriptions. Since it is difficult to ensure complete consistency of images captured by different visual sensors, and the features extracted by Convolutional Neural Networks (CNN) have good resistance to rotation, light transformations, etc., the features extracted using CNN are more useful for calculating costvolume. in some embodiments, the CNN may convert prime gray values of the first localized image and the second localized image into feature descriptions.

(2) based on the feature description of the first localized image and the feature description of the second local image, obtain the Costvolume of projecting the first local image to the second local image. This step can calculate Costvolume by Plane Sweeping algorithm. For the feature descriptions F1 and F2 obtained in the previous step, along the direction of binocular baseline, F2 is shifted according to different parallaxes to obtain F2'. F1 and F2 are summed by dot product to get the Costvolume after each displacement.

(3) Aggregate the Costvolume to obtain the aggregated Costvolume. The value of the Costvolume at each position will be affected by the surrounding positions, so it is necessary to fully aggregate the Costvolume so that the information from the surrounding positions can be transferred to the current position. This embodiment uses convolution to fuse the Costvolume, and in order to increase the sensory field, the Costvolume needs to be downsampled and upsampled during the process of convolution.

(4) Normalizing the aggregated Costvolume to obtain an initial relative positional relationship. After the previous step, a fully aggregated Costvolume can be obtained, in which each position at different depths will have a probability value. The initial depth map can be regressed by normalizing the Costvolume. The normalization process may be achieved by an arg softmax operation. The initial depth map includes a probability value for each point in the scene at different depths.

(5) obtaining the first relative positional relationship based on the initial relative positional relationship and semantic information of the target object. Since there is a large non-overlapping region in the binocular image, and depth information of this region cannot be determined based on binocular parallax, this disclosure utilizes the semantic information of the CNN features to complement the depth map of this region, so that the depth information of the objects in the non-overlapping region can be obtained from the complemented depth map.

Further, a confidence map of the output of the first neural network may also be obtained, the confidence map being used to indicate a confidence level of the first relative positional relationship. A larger confidence level indicates a higher confidence level of the first relative position relationship. Based on the first relative position with a confidence level greater than a predetermined confidence threshold, a positional relationship between a position of the first vision sensor at a first moment and a position of the first vision sensor at the second moment is optimized; the optimized positional relationship is used to determine the second relative positional relationship. On the one hand, the depth information obtained based on semantic complementation does not have the physical constraint of binocular parallax, and by adopting the scheme of the present embodiment, it is possible to add constraints to the depth information obtained based on semantic complementation; on the other hand, it is difficult for a binocular structure to deal with parallel baseline scenarios, and by adopting a confidence map, it is possible to identify such regions, and then adopt the depth information obtained by a monocular algorithm as the depth information for such regions.

Referring to FIG. 8, a schematic illustration of the processing of the second neural network is shown. The processing of the second neural network is similar to the processing of the first neural network, and the following focuses on the differences in the processing of the first neural network and the second neural network, and the same can be found in the embodiment of the processing of the first neural network, which will not be repeated here.

(1) Picking a key reference frame. Determining a distance between a position of the first vision sensor at the first moment and a position of the first vision sensor at the second moment based on a position of the first vision sensor in space at the first moment and a position of the first vision sensor in space at the second moment; if the distance is less than a predetermined value, using an image captured at the first moment and an image captured at the second moment as a key reference frame in step 603 to determine a relative position of an object in the space where the movable platform is located in relation to the movable platform.

(2) Optimizing the positional relationship. According to the depth map obtained in the previous step and the confidence map output from the first neural network, define the confidence threshold $\alpha_1$, record the positions in the confidence map whose confidence is greater than the threshold $\alpha_1$, and optimize the positional relationship between the two moments using the depth information of the corresponding positions.

(3) calculating a feature description F3 of the image captured at the first moment and a feature description F4 of the image captured at the second moment. The calculation is the same as step (2) of the first neural network, and a CNN may be used to calculate the feature description.

(4) Calculating Costvolumes: For features F3 and F4, use Plane Sweeping algorithm to project F4 to the coordinate system of F3 according to different depths, and get the projected feature F4'. F3 and F4' are connected in series to form the Costvolumes.

(5) aggregating Costvolumes, handled in the same way as step (3) of the first neural network.

(6) Computing the initial depth map. After the previous step, a fully aggregated Costvolume can be obtained, where each position at different depths will have a probability value.

(7) Deep information complementation, processed in the same way as step (5) of the first neural network.

Referring to FIG. 9, an overall flowchart of an embodiment of the present disclosure is shown. For any point on an object in space, binocular parallax, monocular parallax, and binocular confidence can be obtained for the point. If the point simultaneously satisfies the conditions that (1) the point is within a binocular overlapping area, (2) the binocular depth (depth calculated by the binocular approach) of the point is less than a predetermined depth threshold d1 (e.g., 20 m), and (3) the confidence level of the binocular depth of the point is greater than a predetermined confidence threshold c1, the binocular parallax is adopted as the actual parallax of the point. If any of the above conditions is not satisfied, it is determined whether the monocular depth (the depth calculated by the monocular approach) satisfies the geometric constraints. If it does, the monocular parallax is used as the actual parallax of the point, if not, the binocular parallax is still used as the actual parallax of the point.

In the above embodiment, the binocular parallax may be a parallax directly determined based on the localized images of the overlapping area, or it may be a parallax of the non-overlapping area inferred based on the images of the overlapping region and the semantic information. Since the parallax, the depth, and the position can be converted to each other, the above parallax can also be replaced with depth or position information. Furthermore, the order of judgment of each of the above conditions is not limited to that shown in FIG. 9. For example, condition (2) may be judged first, then condition (3), and finally condition (1). Since the accuracy of binocular parallax is generally higher, binocular parallax can be prioritized when the above three conditions are satisfied. In practical application, it is also possible to first judge whether the monocular parallax satisfies the geometric constraints, and if it does, the monocular parallax is directly adopted; if it does not, it is then replaced with the binocular parallax. The embodiment of the present disclosure fully fuses the monocular depth and binocular depth based on information such as the range of the overlapping area, the size of the attitude of the visual sensor, the binocular confidence map, and the size of the observation distance, etc. In the event of failure of the monocular or binocular computation, the result computed by another method can be quickly replenished by adopting the judgmental strategy according to one embodiment of the present disclosure to achieve a dynamic switching strategy, making the system more stable and robust.

In some embodiments, after step 603, absolute position information of the object in the space may also be determined based on the relative position of the object to the movable platform. The absolute position information may be the absolute position coordinates of the object in a predetermined coordinate system (e.g., a coordinate system of the movable platform or a world coordinate system). For example, in the case where the preset coordinate system is a world coordinate system, latitude and longitude height information of the object may be obtained.

In some embodiments, a direction of movement of the movable platform may be determined; based on a first image region in the first localized image related to the direction of movement, a second image region in the second localized image related to the direction of movement, a third image region in image captured at the first moment related to the direction of movement, and a fourth image region captured at the second moment related to the direction of movement, thereby determining a relative position of an object in the space where the movable platform is located in relation to the movable platform. Each of the image regions associated with the direction of movement may be an image region comprising a region in the direction of movement.

Taking a movable platform as an unmanned vehicle as an example, a visual range of a vision sensor mounted on the unmanned vehicle may include a region directly in front of the unmanned vehicle, a region to the left of the unmanned vehicle, and a region to the right of the unmanned vehicle while the unmanned vehicle is traveling in a straight forward direction. Therefore, a first image region including the region directly in front of the unmanned vehicle may be segmented from other parts of the first image region. Other image regions are segmented in a similar manner and are not described herein. Determining a relative positional relationship between an object and the movable platform based on the segmented image regions can reduce arithmetic power consumption and improve processing efficiency.

In some embodiments, an update frequency of the relative positional relationship is determined based on the moving speed of the movable platform and the relative position relationship; the relative positional relationship is updated based on the update frequency. For example, in cases where the movable platform is moving at a slower speed, and/or in cases where the position of an object corresponding to the relative positional relationship is farther away from the movable platform, the relative positional relationship may be updated at a lower frequency. In the case where the movable platform moves faster, and/or in the case where the distance between the position of the object corresponding to the relative position relation and the movable platform is closer, the relative position relation may be updated at a higher frequency. By dynamically adjusting the frequency of updating the relative position relationship, it is possible to balance the safety of the movable platform with the consumption of resources when acquiring the relative position relationship.

Some embodiments of the present disclosure also provide an imaging device comprising a processor, the device being applied to a removable platform, the removable platform comprising a first vision sensor and a second vision sensor, the first vision sensor having a first visual range partially overlapping with the second visual range of the second visual sensor, the processor being used to perform the following steps:

obtaining a first localized image of the first vision sensor within an overlapping visual range, obtaining a second localized image of the second vision sensor within an overlapping visual range;

acquiring an image captured by the first vision sensor at a first moment and an image captured at a second moment, the first vision sensor being positioned in space at the first moment differently than it is positioned in space at the second moment;

determining a relative position of an object in the space where the movable platform is located in relation to the movable platform based on the first localized image, the second localized image, the image captured at the first moment and the image captured at the second moment.

In some embodiments, the processor is specifically used to: determine a first relative positional relationship between the object and the movable platform based on the first localized image and the second localized image; determine a second relative positional relationship between the object and the movable platform based on image captured at the first moment and the image captured at the second moment; determine a relative positional relationship between the object and the movable platform based on the first relative positional relationship and the second relative positional relationship between the object and the movable platform.

In some embodiments, the processor is specifically used to: determine, based on the first localized image and the second localized image, a relative positional relationship between a target object with the same semantic information as the first object within the overlapping visual range and the movable platform; determine, based on the relative positional relationship between the target object and the movable platform, a first relative positional relationship between the first object and the movable platform.

In some embodiments, the processor is specifically used to: determine the second relative positional relationship as a relative positional relationship between the first object and the movable platform in the event that the second relative positional relationship satisfies a geometrical constraint corresponding to the first object; and in the event that the second relative positional relationship does not satisfy the geometrical constraint, determine the first relative positional relationship as a relative positional relationship between the first object and the movable platform.

In some embodiments, the processor is specifically used to: determine a first relative positional relationship between the second object and the movable platform based on the first localized image and the second localized image.

In some embodiments, the processor is specifically used to: determine the first relative positional relationship to be a relative positional relationship between the second object and the movable platform if a preset condition is satisfied; determine the second relative positional relationship to be a relative positional relationship between the second object and the movable platform if the preset condition is not satisfied; the preset condition comprising: a depth of the second object being less than a preset depth threshold; and a confidence level of the first relative positional relationship being greater than a preset confidence level threshold.

In some embodiments, the first relative positional relationship is obtained by processing the first localized image and the second localized image by a first neural network, and the second relative positional relationship is obtained by processing the image captured at the first moment and the image captured at the second moment by a second neural network.

In some embodiments, the first neural network obtains the first relative positional relationship based on: performing feature extraction on the first localized image and the second localized image respectively, obtaining a feature description of the first localized image and a feature description of the second localized image; obtaining a projection cost for projecting the first local image and the feature description of the second local image; based on the feature description of the first local image and the feature description of the second local image, obtaining a projection cost for projecting the first local image to the second local image; aggregating the projection cost to obtain an aggregated projection cost; normalizing the aggregated projection cost to obtain an initial relative position relationship; and obtaining the first relative positional relationship based on the initial relative positional relationship and semantic information of the target object.

In some embodiments, the first neural network is trained based on a first localized sample image of the first vision sensor in the overlapping visual range and a second localized sample image of the second vision sensor in the overlapping visual range; the second neural network is trained based on a sample image captured by the first vision sensor at a third moment and a sample image captured at a fourth moment; wherein the first vision sensor is positioned in space at the third moment differently than it is positioned in space at the fourth moment.

In some embodiments, the processor is specifically used to: determine a distance between a position of the first vision sensor at the first moment and a position of the first vision sensor at the second moment based on a position of the first vision sensor in space at the first moment and a position of the first vision sensor in space at the second moment; and, if the distance is less than a preset value, determine a relative position of an object in the space where the movable platform is located to the movable platform based on the first localized image, the second localized image, the image captured at the first moment and the image captured at the second moment.

In some embodiments, the processor is further used to: obtain a confidence map of the output of the first neural network, the confidence map being used to indicate a confidence level of the first relative positional relationship; optimize a posture relationship between a posture of the first vision sensor at a first moment in time and a posture of the first vision sensor at the second moment in time based on the first relative positions for which the confidence level is greater than a predetermined confidence threshold; The optimized positional relationship is used to determine the second relative positional relationship.

In some embodiments, the movable platform is an unmanned aerial vehicle (UAV), one of the first vision sensor and the second vision sensor is disposed on the top of the fuselage of the UAV, and the other is disposed on the bottom of the fuselage of the UAV; or the movable platform is an unmanned aerial vehicle (UAV); one of the first vision sensor and the second vision sensor is disposed on the first side of the unmanned aerial vehicle, and the other is disposed on the second side of the unmanned aerial vehicle, the first side being opposite to the second side; or the movable platform is an unmanned vehicle, and the first vision sensor and second vision sensor are set on each of the unmanned vehicle's two headlights, or on both sides of the windshield, respectively; or the movable platform is a movable robot, and the first vision sensor and second vision sensors are respectively provided at a position where the two eyes of the movable robot are located.

In some embodiments, at least one of the first vision sensor and the second vision sensor is a fisheye camera.

In some embodiments, the area of the overlapping visual range of the first vision sensor and second vision sensor is smaller than the area of the non-overlapping visual range.

In some embodiments, the processor is further used to: determine absolute positional information of the object in the space based on the relative position of the object in relation to the movable platform.

In some embodiments, the processor is specifically used to: determine a direction of movement of the movable platform; determine a relative position of an object in the space in which the movable platform is located in relation to the movable platform based on a first image region in the first localized image that is related to the direction of movement, a second image region in the second localized image that is related to the direction of movement, a third image region in the image captured at the first moment in relation to the direction of movement, and a fourth image region in the image captured at the second moment in relation to the direction of movement.

In some embodiments, the processor is further used to: determine an update frequency of the relative positional relationship based on a movement speed of the movable platform and the relative position relationship; update the relative positional relationship based on the update frequency.

FIG. 10 illustrates a schematic diagram of a hardware structure of an image processing device, which may include: a processor 1001, a memory 1002, an input/output interface 1003, a communication interface 1004, and a bus 1005, wherein the processor 1001, the memory 1002, the input/output interface 1003, and the communication interface 1004 realize communication connections among each other within the device via the bus 1005.

The processor 1001 may be implemented by means of a general-purpose CPU (Central Processing Unit, CPU), a microprocessor, an Application Specific Integrated Circuit, ASIC, or one or more integrated circuits for executing a relevant program, for example to realize the technical solutions provided in the embodiments of this specification. The processor 1001 may also include a graphics card, the graphics card may be an Nvidia titan X graphics card or a 1080Ti graphics card, etc.

The memory 1002 may be realized in the form of Read Only Memory (ROM), Random Access Memory (RAM), static storage device, dynamic storage device, and the like. The memory 1002 may store an operating system and other application programs, and in realizing the technical solutions provided in the embodiments of this specification through software or firmware, the relevant program code is stored in the memory 1002 and called by the processor 1001 for execution.

The input/output interface 1003 is used to connect input/output modules for information input and output. The input/output/module may be configured as a component in the device (not shown in the figure), or may be externally connected to the device to provide the corresponding function. The input devices may include a keyboard, a mouse, a touch screen, a microphone, various types of sensors, etc., and the output devices may include a display, a speaker, a vibrator, an indicator light, etc.

The communication interface 1004 is used to connect a communication module (not shown in the figure) to realize communication interaction between this device and other devices. Wherein the communication module may realize communication by wired means (e.g., USB, network cable, etc.) or by wireless means (e.g., mobile network, WIFI, Bluetooth, etc.).

The bus 1005 includes a pathway to transfer information between various components of the device, such as the processor 1001, the memory 1002, the input/output interface 1003, and the communication interface 1004.

It is to be noted that although only the processor 1001, the memory 1002, the input/output interface 1003, the communication interface 1004, and the bus 1005 are shown in the above-described apparatus, in specific implementations, the apparatus may also include other components that are necessary to realize normal operation. In addition, it will be appreciated by those skilled in the art that the above-described device may also include only the components necessary to realize the embodiment scheme of the present specification, and need not include all of the components shown in the drawings.

Referring to FIG. 11, some embodiments of the present disclosure also provide a movable platform comprising:

a first vision sensor 1101 and a second vision sensor 1102 for collecting images of an environmental area around the movable platform, respectively, the first visual range of the first vision sensor 1101 partially overlapping with the second visual range of the second vision sensor 1102; and an image processing device 1103, wherein the image processing device 1103 may adopt any of the aforementioned image processing device described in the embodiments, and the specific details of the image processing device are detailed in the foregoing embodiments and will not be repeated herein.

The solution of the embodiments of the present disclosure may also be used in VR glasses, in those application scenarios, the first vision sensor and the second vision sensor are provided on the left frame and the right frame, respectively, of the AR glasses. The VR glasses can sense objects in a realistic scene, and then render a virtual scene object based on the realistic objects. For example, if there is a table at a position in front of the user, a virtual doll model can be rendered on the table. By sensing the distance between objects in the space where the user is located and the user, a virtual scene object can be rendered at the appropriate location.

The image processing method and apparatus of some embodiments of the present disclosure may also be applied to a remote control device communicatively coupled to the movable platform. In this context, some embodiments of the present disclosure also provide an image processing system comprising a movable platform, the movable platform being mounted with a first vision sensor and a second vision sensor, the first vision sensor having a first visual range partially overlapping with a second visual range of the second vision sensor; and a remote control device, the remote control device comprising a processor, the processor being used to perform the method described in any of the embodiments of the present disclosure.

Some embodiments of the present disclosure further provide a computer readable storage medium, the readable storage medium having stored thereon a number of computer instructions, the computer instructions being executed to effectuate the steps of the method described in any of the embodiments.

Various technical features in the above embodiments can be combined arbitrarily, as long as there is no conflict or contradiction between the combination of features, but due to limited space, not described one by one, so the combination of various technical features in the above embodiments arbitrarily also belongs to the scope of the disclosure of this specification.

Some embodiments of the present disclosure may take the form of a computer program product implemented on one or more storage media (including, but not limited to, disk memory, CD-ROM, optical memory, and the like) containing program code therein. Computer usable storage media include permanent and non-permanent, removable and non-removable media, and may be implemented by any method or technique for information storage. The information may be computer-readable instructions, data structures, modules of a program, or other data. Examples of storage media for computers include, but are not limited to, phase-change memory (PRAM), static random access memory (SRAM), dynamic random access memory (DRAM), other types of random access memory (RAM), read-only memory (ROM), electrically erasable programmable read-only memory (EEPROM), flash memory or other memory technologies, read-only CD-ROM Memory (CD-ROM), Digital Versatile Disc (DVD) or other optical storage, magnetic cartridge tapes, magnetic tape disk storage or other magnetic storage devices, or any other non-transport media that can be used to store information that can be accessed by computing devices.

Other embodiments of the present disclosure will readily come to mind to those skilled in the art upon consideration of the specification and practice of the specification disclosed herein. The present disclosure is intended to cover any variations, uses, or adaptations of the present disclosure that follow the general principles of the present disclosure and include means of common knowledge or customary skill in the art not disclosed herein. The specification and embodiments are to be regarded as exemplary only, and the true scope and spirit of the present disclosure is indicated by the following claims.

It is to be understood that the present disclosure is not limited to the precise structure that has been described above and illustrated in the accompanying drawings, and that various modifications and changes may be made without departing from its scope. The scope of the present disclosure is limited only by the appended claims.

The foregoing is only a preferred embodiment of the present disclosure, and is not intended to limit the present disclosure, and any modifications, equivalent substitutions, improvements, etc. made within the spirit and principles of the present disclosure shall be included in the scope of protection of the present disclosure.

What is claimed is:

1. An image processing method applied to a movable platform, the movable platform comprising a first vision sensor and a second vision sensor, the first vision sensor having a first visual range partially overlapping a second visual range of the second vision sensor, the method comprising:

obtaining a first localized image of the first vision sensor within an overlapping visual range, obtaining a second localized image of the second vision sensor within the overlapping visual range;

acquiring an image captured by the first vision sensor at a first moment and an image captured at a second moment, the first vision sensor being positioned in a space at the first moment differently than at the second moment; and determining a relative positional relationship between an object in the space where the movable platform is located and the movable platform based on the first localized image, the second localized image, the image captured at the first moment and the image captured at the second moment, including:

determining a direction of movement of the movable platform; and based on a first image region in the first localized image related to the direction of movement, a second image region in the second localized image related to the direction of movement, a third image region in the image captured at the first moment related to the direction of movement, and a fourth image region in the image captured at the second moment related to the direction of movement, determining the relative positional relationship between the object in the space in which the movable platform is located and the movable platform.

2. The image processing method according to claim 1, wherein determining the relative positional relationship between the object in the space where the movable platform is located and the movable platform based on the first localized image, the second localized image, the image captured at the first moment and the image captured at the second moment, further includes:

determining, based on the first localized image and the second localized image, a first relative positional relationship between the object and the movable platform;

determining a second relative positional relationship between the object and the movable platform based on the image captured at the first moment and the image captured at the second moment; and determining the relative positional relationship between the object and the movable platform based on the first relative positional relationship and the second relative positional relationship.

3. The image processing method according to claim 2, wherein:

the object comprises a first object that is within the first visual range of the first vision sensor and outside the second visual range of the second vision sensor; and determining the first relative positional relationship between the object and the movable platform based on the first localized image and the second localized image includes:

determining, based on the first localized image and the second localized image, a relative positional relationship between a target object having same semantic information as the first object within the overlapping visual range and the movable platform; and determining the first relative positional relationship between the first object and the movable platform based on the relative positional relationship between the target object and the movable platform.

4. The image processing method according to claim 3, wherein determining the relative position of the object to the movable platform based on the first relative positional relationship and the second relative positional relationship comprises:

in an event that the second relative positional relationship satisfies geometric constraints corresponding to the first object, determining the second relative positional relationship as the relative positional relationship between the first object and the movable platform; and in an event that the second relative positional relationship does not satisfy the geometric constraints, determining the first relative positional relationship as the relative positional relationship between the first object and the movable platform.

5. The image processing method according to claim 2, wherein;

the object comprises a second object in the overlapping visual range; and determining the first relative positional relationship between the object and the movable platform based on the first localized image and the second localized image includes:

determining, based on the first localized image and the second localized image, a first relative positional relationship between the second object and the movable platform.

6. The image processing method according to claim 5, wherein determining the relative positional relationship between the object and the movable platform based on the first relative positional relationship and the second relative positional relationship comprises:

in an event that a predetermined condition is satisfied, determining the first relative positional relationship as the relative positional relationship between the second object and the movable platform; and in the event that the predetermined condition is not satisfied, determining the second relative positional relationship as the relative positional relationship between the second object and the movable platform, wherein the predetermined condition comprises:

a depth of the second object is less than a predetermined depth threshold; and a confidence level of the first relative positional relationship is greater than a predetermined confidence threshold.

7. The image processing method according to claim 2, wherein the first relative positional relationship is obtained by processing the first localized image and the second localized image by a first neural network, and the second relative position relationship is obtained by processing the image captured at the first moment and the another image captured at the second moment by a second neural network.

8. The image processing method according to claim 7, wherein the first neural network obtains the first relative positional relationship based on:

performing feature extraction on the first localized image and the second localized image, respectively, to obtain a feature description of the first localized image and a feature description of the second localized image;

obtaining costvolumes for projecting the first localized image onto the second localized image based on the feature description of the first localized image and the feature description of the second localized image;

aggregating the costvolumes to obtain an aggregated costvolume;

normalizing the aggregated costvolume to obtain an initial relative positional relationship; and obtaining the first relative positional relationship based on the initial relative positional relationship and semantic information of a target object within the overlapping visual range having same semantic information as the first object.

9. The image processing method according to claim 7, wherein:

the first neural network is obtained by training based on a first localized sample image of the first vision sensor in the overlapping visual range and a second localized sample image of the second vision sensor in the overlapping visual range;

the second neural network is obtained by training based on a sample image acquired by the first vision sensor at a third moment and a sample image acquired at a fourth moment; and the first vision sensor is positioned in the space at the third moment differently than at the fourth moment.

10. The image processing method according to claim 1, wherein determining the relative positional relationship between the object in the space in which the movable platform is located and the movable platform based on the first localized image, the second localized image, the image captured at the first moment, and the image captured at the second moment, further comprises:

determining a distance between a position of the first vision sensor at the first moment and a position of the first vision sensor at the second moment based on a position of the first vision sensor in the space at the first moment and a position of the first vision sensor in space at the second moment; and in response to the distance being less than a predetermined value, determining a relative positional relationship between the object in the space where the movable platform is located and the movable platform based on the first localized image, the second localized image, the image captured at the first moment, and the image captured at the second moment.

11. The image processing method according to claim 7, further comprising:

obtaining a confidence map of an output of the first neural network, the confidence map being configured to indicate a confidence level of the first relative positional relationship; and optimizing a positional relationship between the position of the first vision sensor at the first moment and the position of the first vision sensor at the second moment based on the first relative positional relationship with a confidence level greater than a predetermined confidence threshold; the optimized positional relationship being configured to determine the second relative positional relationship.

12. The image processing method according to claim 1, wherein:

the movable platform is a vehicle; the overlapping visual range comprising an ambient area surrounding the vehicle, the ambient area comprising two areas where two opposing parts of the vehicle face; or the movable platform is an unmanned vehicle, the first vision sensor and the second vision sensor are provided on two headlights of the unmanned vehicle, or on both sides of a windshield, respectively; or the movable platform is a movable robot, and the first vision sensor and the second vision sensor are provided at positions where the two eyes of the movable robot are located, respectively.

13. The image processing method according to claim 12, wherein:

the vehicle is an unmanned aerial vehicle (UAV); and
one of the first vision sensor and the second vision sensor is provided at a top of a fuselage of the UAV and the other is provided at a bottom of the fuselage of the UAV; or
one of the first vision sensor and the second vision sensor is provided on a first side of the UAV and the other is provided on a second side of the UAV, the first side being provided opposite the second side.

14. The image processing method according to claim 1, wherein at least one of the first vision sensor or the second vision sensor is a fisheye camera.

15. The image processing method according to claim 1, wherein an area of the overlapping visual range of the first vision sensor and the second vision sensor is smaller than an area of the non-overlapping visual range of the first vision sensor and the second vision sensor.

16. The image processing method according to claim 1, further comprising:

determining information about an absolute position of the object in the space based on the relative positional relationship between the object and the movable platform.

17. The image processing method according to claim 1, further comprising:

determining a frequency of updating the relative positional relationship based on a speed of movement of the movable platform and the relative positional relationship; and
updating the relative positional relationship based on the update frequency.

18. An image processing device comprising a processor, the device is applied to a movable platform, the movable platform comprising a first vision sensor and a second vision sensor, the first vision sensor having a first visual range partially overlapping with a second visual range of the second vision sensor, and the processor being configured to perform following steps:

obtaining a first localized image of the first vision sensor within an overlapping visual range, obtaining a second localized image of the second vision sensor within an overlapping visual range;
acquiring an image captured by the first vision sensor at a first moment and an image captured at a second moment, the first vision sensor being positioned in a space at the first moment differently than at the second moment; and
determining a relative positional relationship between an object in a space where the movable platform is located and the movable platform based on the first localized image, the second localized image, the image captured at the first moment and the image captured at the second moment, including:

determining a direction of movement of the movable platform; and
based on a first image region in the first localized image related to the direction of movement, a second image region in the second localized image related to the direction of movement, a third image region in the image captured at the first moment related to the direction of movement, and a fourth image region in the image captured at the second moment related to the direction of movement, determining the relative positional relationship between the object in the space in which the movable platform is located and the movable platform.

19. A movable platform, comprising:

a first vision sensor and a second vision sensor for capturing images of an ambient area around the movable platform, respectively, the first vision sensor having the first visual range partially overlapping with the second visual range of the second vision sensor; and
the image processing device of claim 18.

20. An image processing method applied to a movable platform, the movable platform comprising a first vision sensor and a second vision sensor, the first vision sensor having a first visual range partially overlapping a second visual range of the second vision sensor, the method comprising:

obtaining a first localized image of the first vision sensor within an overlapping visual range, obtaining a second localized image of the second vision sensor within the overlapping visual range;
acquiring an image captured by the first vision sensor at a first moment and an image captured at a second moment, the first vision sensor being positioned in a space at the first moment differently than at the second moment; and
determining a relative positional relationship between an object in the space where the movable platform is located and the movable platform based on the first localized image, the second localized image, the image captured at the first moment and the image captured at the second moment, including:

determining a distance between a position of the first vision sensor at the first moment and a position of the first vision sensor at the second moment based on a position of the first vision sensor in space at the first moment and a position of the first vision sensor in space at the second moment; and
in response to the distance being less than a predetermined value, determining a relative positional relationship between the object in the space where the movable platform is located and the movable platform based on the first localized image, the second localized image, the image captured at the first moment, and the image captured at the second moment.

* * * * *